United States Patent
Li et al.

(10) Patent No.: US 10,805,056 B2
(45) Date of Patent: Oct. 13, 2020

(54) WIRELESS STATION CONTROL OF WLAN RECEIVE OPERATING MODE CHANGE

(71) Applicant: Apple Inc., Cupertino, CA (US)

(72) Inventors: Guoqing Li, Campbell, CA (US); Christiaan A. Hartman, San Jose, CA (US); Joonsuk Kim, Saratoga, CA (US); Su Khiong Yong, Palo Alto, CA (US); Yong Liu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 399 days.

(21) Appl. No.: 15/336,728

(22) Filed: Oct. 27, 2016

(65) Prior Publication Data

US 2017/0126461 A1 May 4, 2017

Related U.S. Application Data

(60) Provisional application No. 62/247,561, filed on Oct. 28, 2015.

(51) Int. Cl.
| | |
|---|---|
| *H04L 5/00* | (2006.01) |
| *H04W 52/02* | (2009.01) |
| *H04W 28/18* | (2009.01) |
| *H04L 1/00* | (2006.01) |
| *H04W 84/12* | (2009.01) |

(52) U.S. Cl.
CPC .............. *H04L 5/0096* (2013.01); *H04L 1/00* (2013.01); *H04W 28/18* (2013.01); *H04W 52/0209* (2013.01); *H04W 84/12* (2013.01); *Y02D 70/1262* (2018.01); *Y02D 70/1264* (2018.01); *Y02D 70/142* (2018.01); *Y02D 70/144* (2018.01); *Y02D 70/166* (2018.01); *Y02D 70/22* (2018.01); *Y02D 70/26* (2018.01)

(58) Field of Classification Search
CPC ...... H04W 84/12; H04W 28/18; H04L 5/0096
See application file for complete search history.

(56) References Cited

U.S. PATENT DOCUMENTS

| | | | |
|---|---|---|---|
| 2015/0173014 A1* | 6/2015 | Lee | H04W 52/0216 370/311 |
| 2016/0105836 A1* | 4/2016 | Seok | H04W 72/042 370/331 |

(Continued)

OTHER PUBLICATIONS

Stacey, Robert; IEEE P802.11, Wireless LANs, Specification Framework for TGax; doc.: IEEE 802.11-15/0132r8; Sep. 22, 2015; 22 pgs.

*Primary Examiner* — Jeffrey M Rutkowski
*Assistant Examiner* — Chae S Lee
(74) *Attorney, Agent, or Firm* — Dickinson Wright RLLP

(57) ABSTRACT

A wireless local area network station (STA) changes a receiver operating mode (ROM) and saves power by influencing when a ROM-conforming access point (AP) transmission takes place. The STA evaluates candidate delay regimes after a negotiation exchange with the STA. The STA then instructs the AP of a selected delay regime which the AP is permitted to use when transmitting data according to the changed ROM. The ROM can involve a change in the system bandwidth demodulated by the STA and/or the number of spatial streams demodulated by the STA. The delay regime can allow the AP to transmit with little or no delay based on the changed ROM, or the delay regime may require a fixed time delay before the AP transmits according to the changed ROM.

20 Claims, 7 Drawing Sheets

(56) References Cited

U.S. PATENT DOCUMENTS

2016/0233929 A1* 8/2016 van Zelst ................ H04L 5/001
2017/0078967 A1* 3/2017 Asterjadhi ........ H04W 52/0229
2017/0105208 A1* 4/2017 Hedayat .............. H04W 72/048
2018/0124746 A1* 5/2018 Choi ....................... H04L 5/003
2018/0302194 A1* 10/2018 Wang ................... H04L 1/1635

* cited by examiner

WIRELESS STATION CONTROL OF WLAN RECEIVE OPERATING MODE CHANGE

CROSS-REFERENCE TO RELATED APPLICATION

This application claims the benefit of U.S. Provisional Application No. 62/247,561, entitled "WIRELESS STATION CONTROL OF WLAN RECEIVE OPERATING MODE CHANGE" filed on Oct. 28, 2015, which is incorporated by reference herein in its entirety.

FIELD

The described embodiments relate generally to multiple access wireless communications using electronic devices, including systems and techniques for changing a receive operating mode (ROM) of a wireless station (STA) in communication with an access point (AP).

BACKGROUND

Wireless Local Area Networks (WLANs) support uplink and downlink transmission between multiple stations (STAs) and access points (APs). As a general rule an AP can be considered a STA. In some WLAN systems, some of the STAs and some of the APs each have multiple antennas. Orthogonal Frequency Division Multiplexing (OFDM) and Orthogonal Frequency Division Multiple Access (OFDMA) are useful techniques for data transmission. OFDMA distributes subcarriers among users. A time interval over which the subcarriers are orthogonal is an OFDM symbol time. The bandwidth over which the subcarriers are defined can be referred to as a system bandwidth, a channel bandwidth, or a channel width.

Generally, a data modulation value changes once per symbol time. The subcarriers may be called tones. The AP may implement a structure using a P matrix in data tones; the use of the P matrix and data tones is described in Institute of Electronics and Electrical Engineers (IEEE) standard document 802.11ac. The IEEE has published "Specification Framework for TGax," document number IEEE 802.11-15/0132r8, Sep. 22, 2015 (hereinafter "802.11ax Framework"). The 802.11ax Framework describes a framework for a new standard under development at this time.

In the data tones of IEEE 802.11ac, one or more space-time streams are spread over symbols by one row of the P matrix. Different space-time streams use different rows in the P matrix. A STA demodulates a number of spatial streams (NSS). The system bandwidth may be 20 MHz, 40 MHz, or another bandwidth.

In an OFDM system, a receiver operating mode (ROM) can be defined by the number of spatial streams (NSS) a STA is demodulating and by the system bandwidth that a STA is demodulating. A particular transmitter communicating with a particular STA should form the transmit signal based on the particular ROM that the particular STA is using. OFDM approaches involving multiple transmission streams are described in IEEE 802.11n and in IEEE 802.11ac.

An AP can provide downlink data flows to several STAs. Data to be transmitted can be stored in a queue in the AP. A queue is, in general, a first-in first-out (FIFO) buffer. There are many algorithms for taking data packets from a queue to place next into a shared channel. Thus, there are many algorithms for serving a queue. In some algorithms, the logic serving the queue is aware of the queue contents. Awareness of the queue contents can include knowledge of addressees of packets in the queue, the size of each of the packets in the queue, and the Quality of Service (QoS) required for each of the packets in the queue.

Quality of Service generally includes information which summarizes what a user of an application expects out of the medium carrying the application data. For voice, QoS requires that network delay and jitter be capped at small values on the order of tens of milliseconds. For many data applications, a frame error rate must not exceed some maximum, such as, for example, a frame error rate maximum of 0.1%.

As discussed in the 802.11ax Framework under section 6 "MAC" subsection 6.3 "Power Save," a transmitting STA shall have a mechanism for indicating its ROM, e.g. RX NSS, RX (Receive) channel width, in a transmitted DATA type medium access control (MAC) header, so that the responding STA shall not transmit a subsequent physical layer convergence procedure (PLCP) protocol data unit (PPDU) using an NSS or channel width value not indicated as supported in the ROM of the transmitting STA.

A STA may not use battery power efficiently if the time adopted by a responding STA to implement the ROM change is unsuitable. However, the STA responding to the ROM change does not coordinate and consider battery usage at the STA that transmits or indicates the ROM change.

SUMMARY

Representative embodiments set forth herein disclose various systems and techniques for negotiating a STA ROM change with an AP in which the STA controls the delay with which the AP implements the ROM change.

An IEEE 802.11 STA changes a receiver operating mode (ROM) and saves power by influencing when a ROM-conforming AP transmission takes place. The STA evaluates candidate delay regimes after a negotiation exchange with the AP. The STA then instructs the AP on the delay regime which the AP is permitted to use when transmitting data that conforms with the changed ROM. The ROM can involve a change in the system bandwidth demodulated by the STA and/or the number of spatial streams demodulated by the STA. The delay regime can allow the AP to transmit with little or no delay based on the changed ROM, or the delay regime may require a fixed time delay before the AP transmits according to the changed ROM.

A method performed by a STA is presented herein. In some embodiments, the method includes, by the STA: i) receiving, from a wireless local area network access point (AP) according to a first receiver operating mode (ROM) of the STA, a first data packet; ii) sending a ROM indication to the AP; iii) receiving an AP status packet from the AP; and iv) determining a delay regime for reception of a second data packet, wherein: i) the determining is based on the AP status packet, and ii) the second data packet is to be formatted according to a second ROM.

In some embodiments, the method also includes sending an instruction packet to the AP, wherein the instruction packet comprises an indication of the delay regime. In some embodiments, the instruction packet comprises a second indication corresponding to the second ROM. In some embodiments, the delay regime indicates that: i) the AP should send the second data packet formatted according to the second ROM, and ii) the AP should not delay in sending the second data packet. In some embodiments, the method also includes receiving the second data packet formatted according to the second ROM, wherein the receiving the second data packet occurs approximately one short interframe space (SIFS) after an end of the instruction packet. In some embodiments, the delay regime indicates that: i) the AP should send the second data packet formatted according to the second ROM, and ii) the AP should delay in sending the second data packet for a time delay period.

In some embodiments, the method also includes receiving the second data packet formatted according to the second ROM, wherein the receiving the second data packet occurs with a delay greater than one short interframe space (SIFS) after an end of the instruction packet. In some embodiments, a value of the time delay period is indicated in the instruction packet. In some embodiments, the STA and the AP practice portions of a wireless local area network standard, and ii) a value of the time delay period is indicated in the wireless local area network standard. In some embodiments, the delay regime indicates that: a) the AP should send the second data packet formatted according to either the first ROM or the second ROM, and b) the AP should send the second data packet after a time delay of approximately a short interframe space (SIFS); or the delay regime indicates that: a) the AP should send the second data packet formatted according to the second ROM, and b) the AP should send the second data packet after a time delay period. In some embodiments, the STA and the AP practice portions of a wireless local area network standard, and a value of the time delay period is indicated in the wireless local area network standard. In some embodiments, the method also includes receiving, from the AP, an adoption signal, wherein the adoption signal indicates a delay regime adopted by the AP for transmission of the second data packet. In some embodiments, a value of the time delay period is indicated in the instruction packet. In some embodiments, the value of the time delay period is indicated in the instruction packet in terms of: i) a number of milliseconds (ms), or ii) or a number of physical layer convergence procedure protocol data unit (PPDU) intervals.

A STA apparatus is disclosed herein. In some embodiments, the STA includes a wireless transceiver; a processor coupled to the wireless transceiver; and a memory coupled to the processor, wherein the memory includes instructions, that when executed by the processor, cause the STA to execute steps. The steps include i) receiving, from a wireless local area network access point (AP) via the wireless transceiver and according to a first receiver operating mode (ROM) of the STA, a first data packet, ii) sending, via the wireless transceiver, a ROM indication to the AP, iii) receiving, via the wireless transceiver, an AP status packet from the AP, and iv) determining a delay regime for reception of a second data packet, wherein: a) the determining is based on the AP status packet and an energy level of a battery in the STA, and b) the second data packet is to be formatted according to a second ROM. In some embodiments, the steps also include sending, via the wireless transceiver, an instruction packet to the AP, wherein the instruction packet comprises: i) a first indication of the delay regime, and ii) a second indication corresponding to the second ROM. In some embodiments, the delay regime indicates that: i) the AP should send the second data packet formatted according to the second ROM, and ii) the AP should not delay in sending the second data packet. In some embodiments, the delay regime indicates that: i) the AP should send the second data packet formatted according to the second ROM, and ii) the AP should delay in sending the second data packet for a time delay period.

An AP apparatus is disclosed herein. In some embodiments, the AP includes a wireless transceiver; a processor coupled to the wireless transceiver; and a memory coupled to the processor, wherein the memory includes instructions, that when executed by the processor, cause the AP to execute steps. The steps include: i) sending, to a wireless local area network station (STA) via the wireless transceiver and according to a first receiver operating mode (ROM) of the STA, a first data packet, ii) receiving, via the wireless transceiver from the STA, a ROM indication, wherein the ROM indication indicates a number of spatial streams (NSS) and/or a channel width, iii) sending, via the wireless transceiver, an AP status packet to the STA, iv) receiving, via the wireless transceiver, an instruction packet from the STA, wherein the instruction packet comprises: a) a first indication of a delay regime, and b) a second indication corresponding to a second ROM. In some embodiments, the steps also include sending, via the wireless transceiver to the STA, an adoption signal, wherein the adoption signal indicates a delay regime adopted by the AP for transmission of a second data packet.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
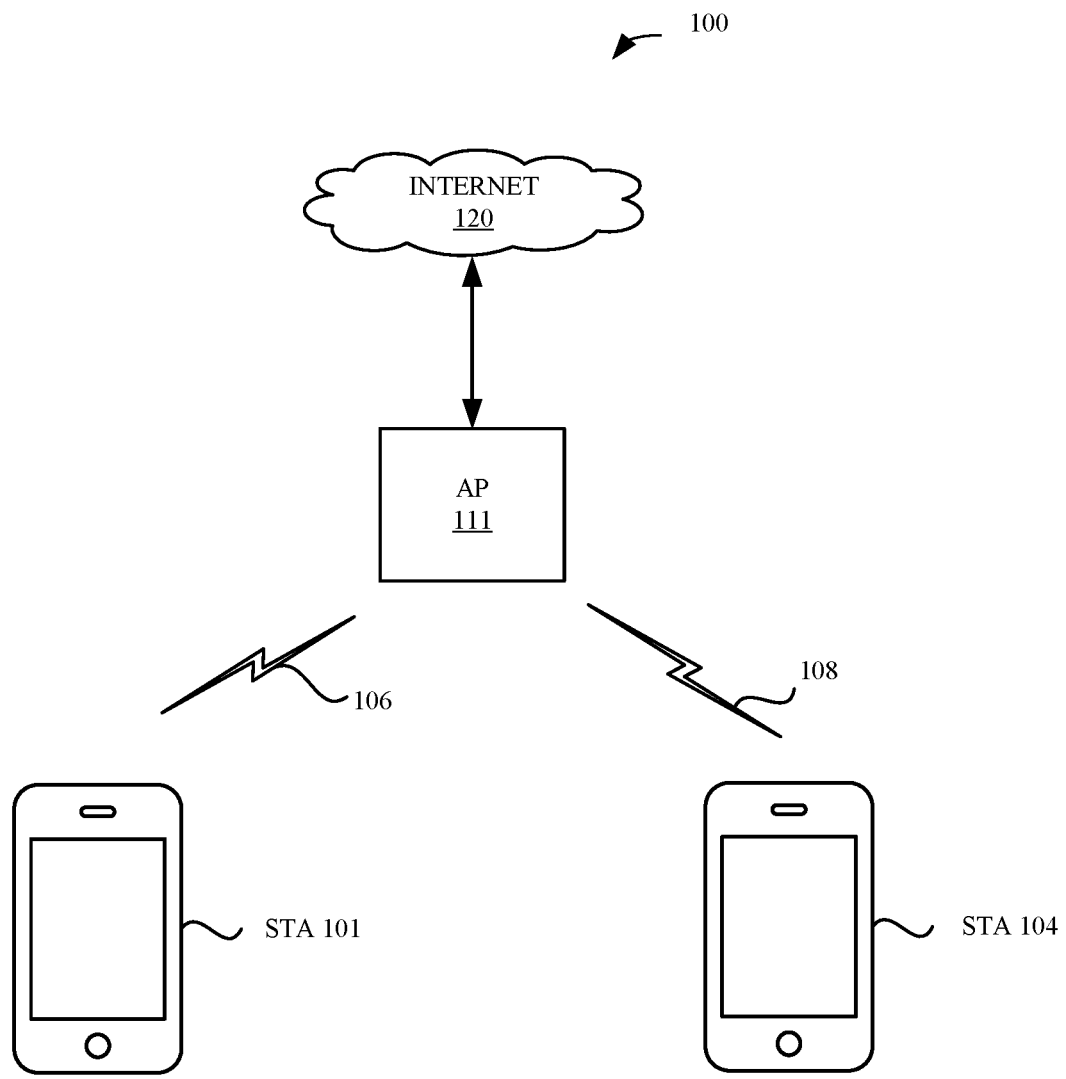
FIG. 1 illustrates a prior art WLAN system including an AP and two WLAN Stations STAs.

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Wireless devices, and mobile devices in particular, can incorporate multiple different radio access technologies (RATs) to provide connections through different wireless networks that offer different services and/or capabilities. A wireless device can include hardware and software to support a wireless personal area network ("WPAN") according to a WPAN communication protocol, such as those standardized by the Bluetooth® special interest group ("SIG") and/or those developed by Apple referred to as an Apple Wireless Direct Link (AWDL). The wireless device can discover compatible peripheral wireless devices and can establish connections to these peripheral wireless devices located in order to provide specific communication services through a WPAN. In some situations, the wireless device can act as a communications hub that provides access to a wireless local area network ("WLAN") and/or to a wireless wide area network ("WWAN") to a wide variety of services that can be supported by various applications executing on the wireless device. Thus, communication capability for an accessory wireless device, e.g., without and/or not configured for WWAN communication, can be extended using a local WPAN (or WLAN) connection to a companion wireless device that provides a WWAN connection. Alternatively, the accessory wireless device can also include wireless circuitry for a WLAN connection and can originate and/or terminate connections via a WLAN connection. Whether to use a direct connection or a relayed connection can depend on performance characteristics of one or more links of an active communication session between the accessory wireless device and a remote device. Fewer links (or hops) can provide for lower latency, and thus a direct connection can be preferred; however, unlike a legacy circuit-switched connection that provides a dedicated link, the direct connection via a WLAN can share bandwidth with other wireless devices on the same WLAN and/or with the backhaul connection from the access point that manages the WLAN. When performance on the local WLAN connection link and/or on the backhaul connection degrades, a relayed connection via a companion wireless device can be preferred. By monitoring performance of an active communication session and availability and capabilities of associated wireless devices (such as proximity to a companion wireless device), an accessory wireless device can request transfer of an active communication session between a direction connection and a relayed connection or vice versa.

In accordance with various embodiments described herein, the terms "wireless communication device," "wireless device," "mobile device," "mobile station," "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax; or other present or future developed IEEE 802.11 technologies.

Additionally, it should be understood that the wireless devices described herein may be configured as multi-mode wireless communication devices that are also capable of communicating via different third generation (3G) and/or second generation (2G) RATs. In these scenarios, a multi-mode wireless device or UE can be configured to prefer attachment to LTE networks offering faster data rate throughput, as compared to other 3G legacy networks offering lower data rate throughputs. For instance, in some implementations, a multi-mode wireless device or UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

The MAC layer in a STA can construct MAC frames. A MAC frame may include a MAC header, a variable length frame body, and a cyclic-redundancy check field called the FCS. The MAC header may include an instance of a duration field, and address information. The MAC header can also include QoS control information and HT control fields (where HT stands for high throughput). The QoS control information, if present, may be in a subfield known as the QoS control field. The QoS control field may include a traffic identifier (TID) and buffer information about data corresponding to the TID. The QoS control field can also include a transmission opportunity (TXOP) duration requested value.

FIG. 1 illustrates a prior art WLAN system including STA 101, STA 104, AP 111, and Internet 120. The wireless connection between STA 101 and AP 111 is indicated as link 106 (and similarly STA 104 with AP 111 as link 108). The direction or sense of these connections is described as follows. Transmission from AP 111 to the STAs is downlink transmission. Transmission from either STA to AP 111 is called uplink transmission. Generally uplink and down link transmission use different frequency bands.

Figure 2:
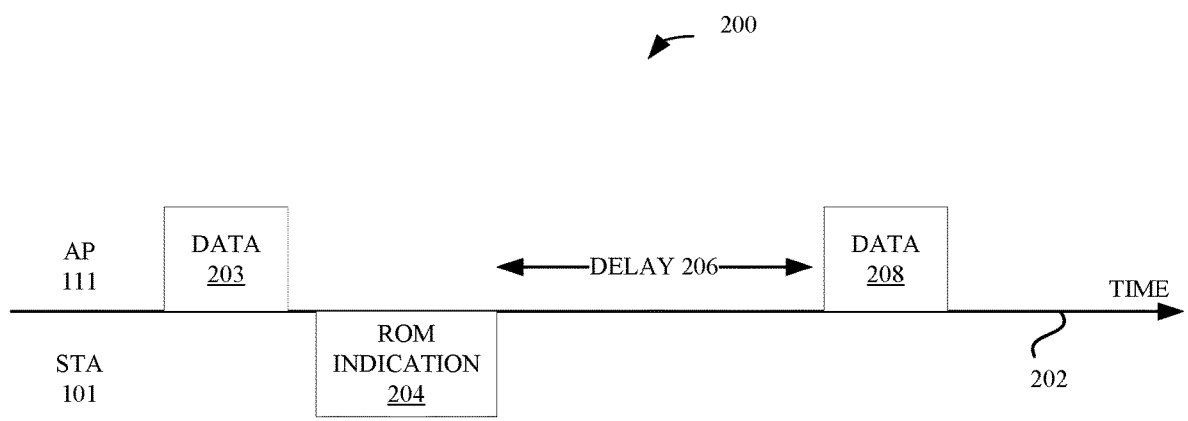
FIG. 2 illustrates a prior art communication sequence involving a ROM indication.

FIG. 2 illustrates a ROM change provided for by the 802.11ax Framework. As discussed above, a transmitting STA, for example, STA 101, shall have a mechanism for indicating its receive operating mode (ROM), e.g. receive NSS, receive channel width, in a transmitted data type MAC header, so that a responding STA, for example, AP 111, shall not transmit a subsequent PPDU using an NSS or channel width value not indicated as supported in the RX operating mode (indicated ROM) of STA 101. The responding STA (for example, AP 111 in FIG. 2) shall not adopt the new NSS and BW (channel width) until a time to be determined, for example, delay 206 of FIG. 2. For example, after some delay, the 802.11ax Framework provides that AP 111 will transmit data with a new system bandwidth (a new number of subcarriers) and that new system bandwidth is the bandwidth indicated by STA 101 in the indicated ROM. Alternatively, there may be no change in system bandwidth, but STA 101 may indicate a changed number of spatial streams which it will demodulate.

Figure 3:
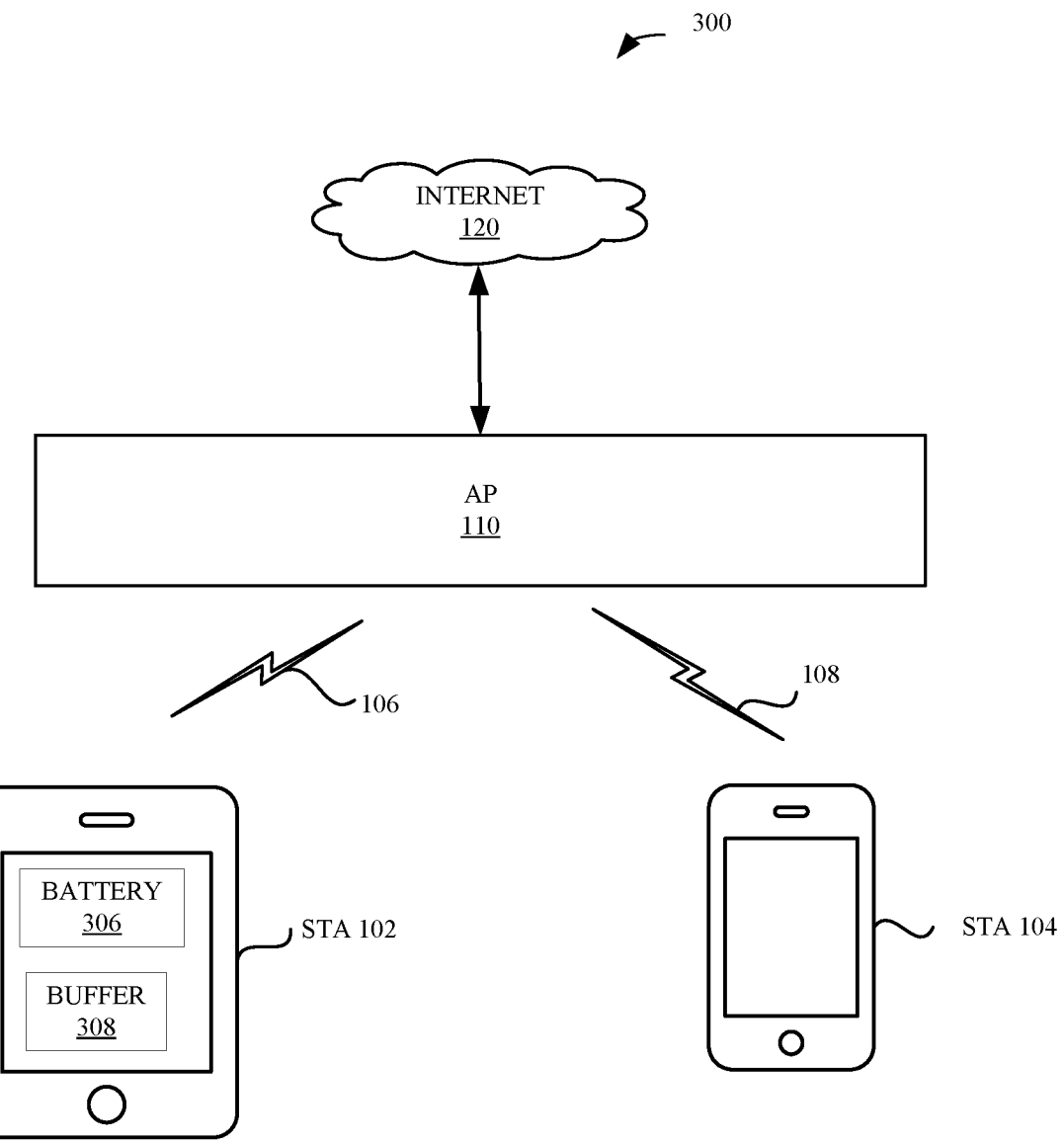
FIG. 3 illustrates an exemplary system with detail of a battery and a buffer in a STA, according to some embodiments.

It is desirable for a STA, for example STA 102 of FIG. 3, to have control of when an AP, for example AP 110 of FIG. 3, will transmit data in a configuration suitable for a ROM change signaled by STA 102. This is beneficial because STA 102 has a battery 306, and the energy in battery 306 should be conserved. STA 102 also has a buffer, buffer 308, for storing data it wishes to transmit on the uplink. Some of the energy of battery 306 will be used to transmit over link 106 the data waiting in buffer 308.

STA 102 of FIG. 3, in an exemplary embodiment, can favor an immediate implementation of a ROM change in terms of the data transmitted by AP 110. Alternatively, in some embodiments, STA 102 can favor a delay of a fixed time before AP 110 formats data according to the ROM change. In some embodiments, STA 102 can signal to AP 110 options for when AP 110 may transmit data configured according to the ROM change.

Figure 4:
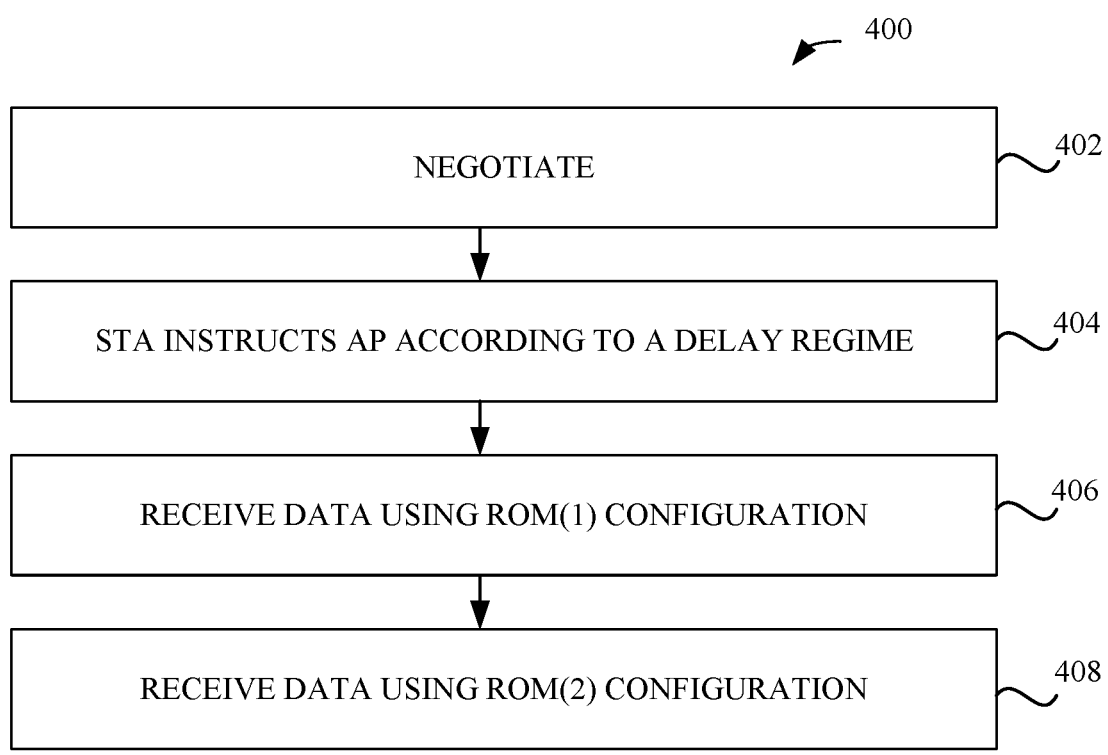
FIG. 4 illustrates exemplary logic in which a STA instructs an AP and downlink reception events subsequent to the instruction, according to some embodiments.

FIG. 4 illustrates exemplary logic for control of the ROM change by the STA (for example, STA 102) indicating the ROM change. At 402, STA 102 and AP 110 can negotiate the ROM change. This can include exchange of capability information and/or status information. STA 102 can decide on an appropriate delay regime from among a set of candidate delay regimes to be applied by AP 110. A delay regime is a sequence which AP 110 is to follow in formatting transmit data according to an existing ROM ("ROM(1)") or a new ROM ("ROM(2)"). At 404, STA 102 instructs AP 110 that a change from an existing ROM configuration (for example, ROM(1)) to a second ROM configuration (for example ROM(2)) will take place after a fixed delay. In general, the opportunities for the AP 110 to use ROM(1) or ROM(2) are referred to herein as a particular delay regime. For example, ROM(1) can include NSS equal to two and system bandwidth equal to forty MHz. For example, ROM (2) can include NSS equal to two and system bandwidth equal to twenty MHz. In some embodiments, AP 110 then transmits a PPDU to STA 102 using the ROM in place before the indication was sent. That is, at 406, AP 110 transmits a PPDU to STA 102 using ROM(1). Subsequently, after a time indicated by STA 102 in the instruction at 404, or a default value indicated or implied by STA 102 in the instruction at 404, AP 110 transmits a PPDU to STA 102 using the new ROM, that is, ROM(2).

Figure 5:
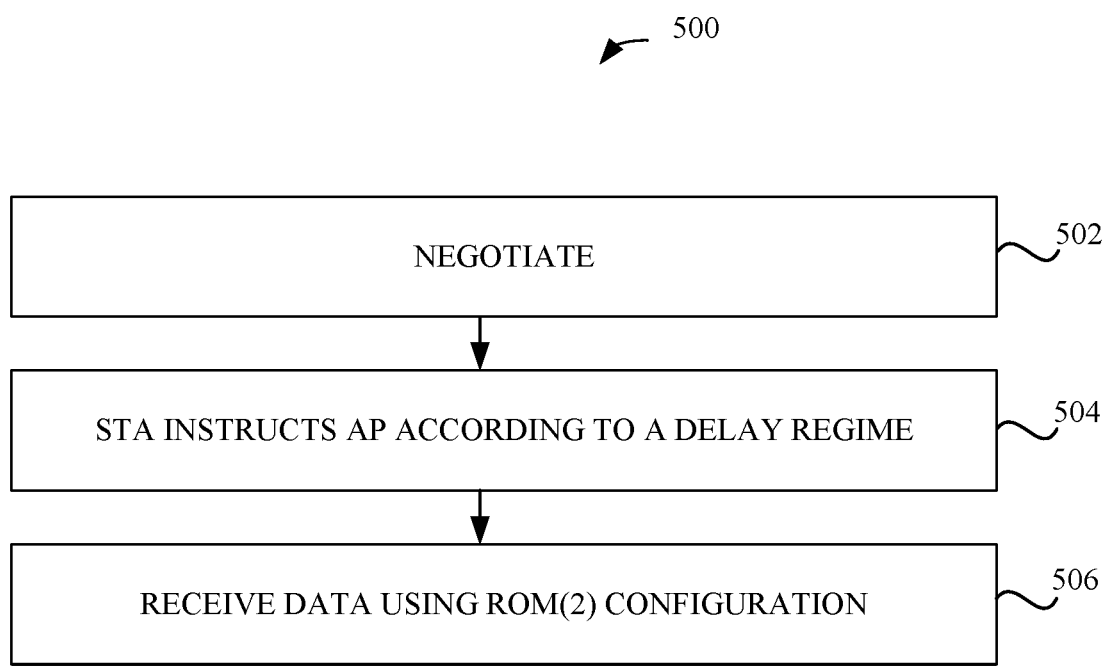
FIG. 5 illustrates exemplary logic in which a STA instructs an AP and a downlink reception event subsequent to the instruction, according to some embodiments.

FIG. 5 illustrates exemplary logic similar to that of FIG. 4, and begins with negotiation at 502, similar to, or the same as, the negotiation at 402 of FIG. 4. Similar to FIG. 4, STA 102 can select an appropriate delay regime to be applied by AP 110. At 504, STA 102 instructs AP 110 to format data to be transmitted on the downlink in accordance with ROM(2) with little or no delay. At 506, AP 110 transmits data in accordance with ROM(2) according to whatever queue service (buffer-draining) algorithm it is running to serve the multiple STAs for which it has downlink data.

Figure 6:
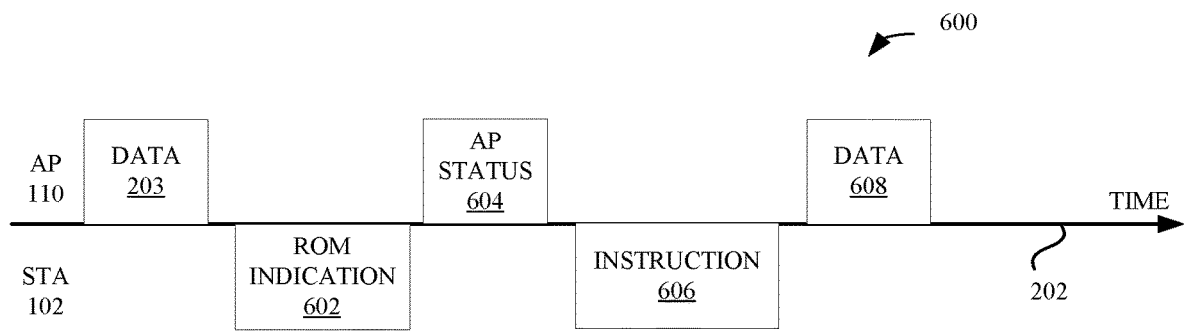
FIG. 6 illustrates an exemplary communication sequence in which a STA instructs an AP that a ROM change will occur with a delay regime comprising little or no delay, according to some embodiments.

FIG. 6 illustrates an exemplary timeline 600. Data 203 is transmitted in accordance with ROM(1). STA 102 then signals a ROM indication 602 to AP 110. ROM indication 602 can include STA 102 status and/or capability information. AP 110 then provides status and/or capability information in the message AP Status 604. This completes an exemplary negotiation. STA 102 then executes a battery or power save algorithm and determines the best time to receive a next PPDU from AP 110 under ROM(2). The energy in battery 306 and/or other inputs can be considered. Similar to FIG. 4, STA 102 can select an appropriate delay regime to be applied by AP 110. In the example of FIG. 6, STA 102 has determined that the next data it receives should be according to ROM(2) with no intervening data configured according to ROM(1). The selected candidate delay regime may be described as "no further ROM(1) data, next data in ROM(2) format." Thus, after instruction 606, the next PPDU AP 110 transmits to STA 102 (shown as data 608) is in conformance with ROM(2). STA 102 does not allow, in FIG. 6, an arbitrary AP-imposed delay in time of formatting transmit data in conformance with ROM(2) by AP 110.

The ROM indication 602, can, for example, be formatted using the High Efficiency (HE) control field. The HE control field can be carried in a QoS data frame. In some embodiments, a STA 102 uses a block acknowledgement (BA) field or a QoS data frame to signal ROM indication 602.

Figure 7:
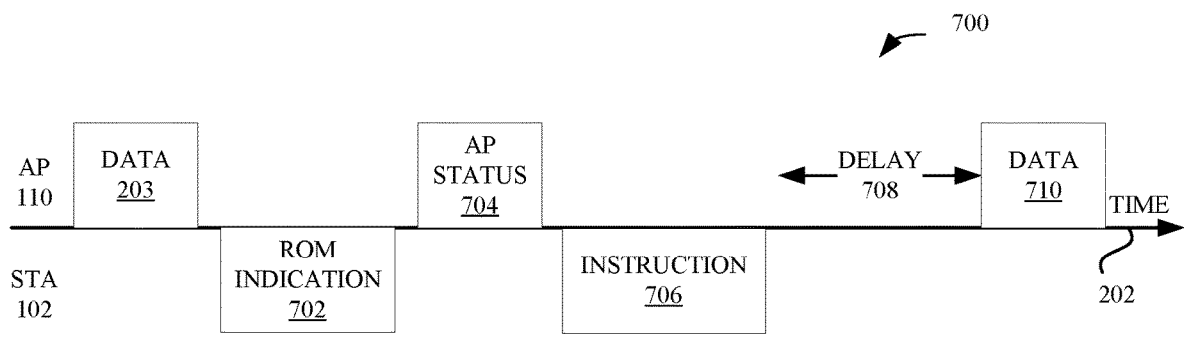
FIG. 7 illustrates an exemplary communication sequence in which a STA instructs an AP that a ROM change will occur with a particular delay regime, according to some embodiments.

FIG. 7 is an exemplary timeline in which negotiation messages 702 and 704 take place, similar to those of FIG. 6, but possibly different in content. STA 102 performs a battery saving decision algorithm based on: i) the power in battery 306, ii) AP status 704, and/or iii) other factors. STA 102 determines that no immediate data should be received according to a changed ROM (the changed ROM being designated ROM(2) for example). Rather, a delay 708 should occur before data is received according to ROM(2). Although no data is shown between instruction 706 and data 710, in some embodiments, the delay regime selected by STA 102 can permit transmission by AP 110 of data according to ROM(1) in this interval. The selected delay regime may be described as "ROM(1) formatted data is permitted for the next time interval of duration 708, and after that, only data in ROM(2) format is permitted." Similarly to FIG. 6, ROM indication 702, can, for example, be sent using the HE control field. In some embodiments, STA 102 uses a BA field or a QoS data frame to signal ROM indication 702. Delay 708 may be indicated in milliseconds (ms) in instruction 706, or PPDU intervals, or be a defined time recorded in a standards specification.

Figure 8:
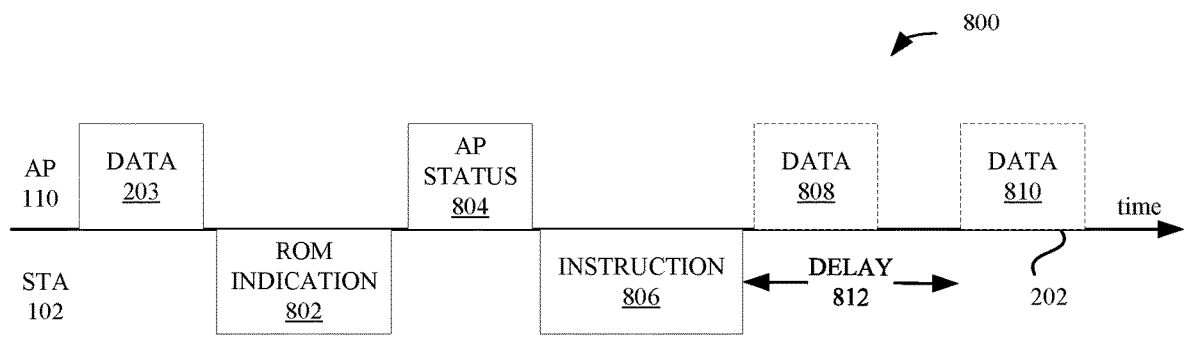
FIG. 8 illustrates an exemplary communication sequence in which a STA provides options to an AP as to when a ROM will change, according to some embodiments.

FIG. 8 is an exemplary timeline in which STA 102 provides options to AP 110. Negotiation messages 802 and 804 take place similar to corresponding messages in FIGS. 6 and 7. STA 102 performs a battery saving decision algorithm based on the power in battery 306, AP status 804, and/or other inputs. STA 102 sends instruction 806. In some embodiments, instruction 806 provides a flexible delay regime to AP 110 in terms of the delay until a first transmission from AP 110 occurs. In the example of FIG. 8, instruction 806 provides AP 110 the option to 1) transmit data in accordance with ROM(1) or ROM(2) after little or no delay (shown as data 808 in a shape with dashed lines) or 2) transmit data in accordance with only ROM(2) after a delay of delay 812 or more (option 2 transmit data shown as data 810 in a shape with dashed lines). Delay 812 may be indicated in milliseconds (ms) in instruction 806, or PPDU intervals, or be a defined time recorded in a standards specification. The selected delay regime may be described as "next data in ROM(1) or ROM(2) format, with delay not to exceed time 812, transmit in ROM(2) format only after time 812." AP 110 can send an adoption signal to STA 102 indicating the delay regime that AP 110 adopts from among the options signaled by STA 102 (adoption signal not shown in FIG. 8).

In general, STA 102 searches through a finite set of candidate delay regimes to identify a delay regime satisfying a set of constraints and possibly characterized by a strong figure of merit. If STA 102 decides that battery power is not an issue at a given time such that a manifold or surface or set of evaluated values representing the variation of a figure of merit over the candidate delay regimes is acceptable everywhere (that is, for any of the candidate delay regimes a variance of a figure of merit is less than an energy threshold amount), instruction 806 can delegate selection of the delay regime to AP 110.

The logic used by STA 102 to decide on the instruction to send AP 110 can depend on the amount of time that will be needed to receive packets from AP 110. A power consumption model used by STA 102 can include energy required for packet acquisition (such as radio frequency (RF) receiver stages and analog-to-digital conversion), physical layer processing (such as demodulation and decoding), and MAC frame processing.

Representative Exemplary Apparatus

Figure 9:
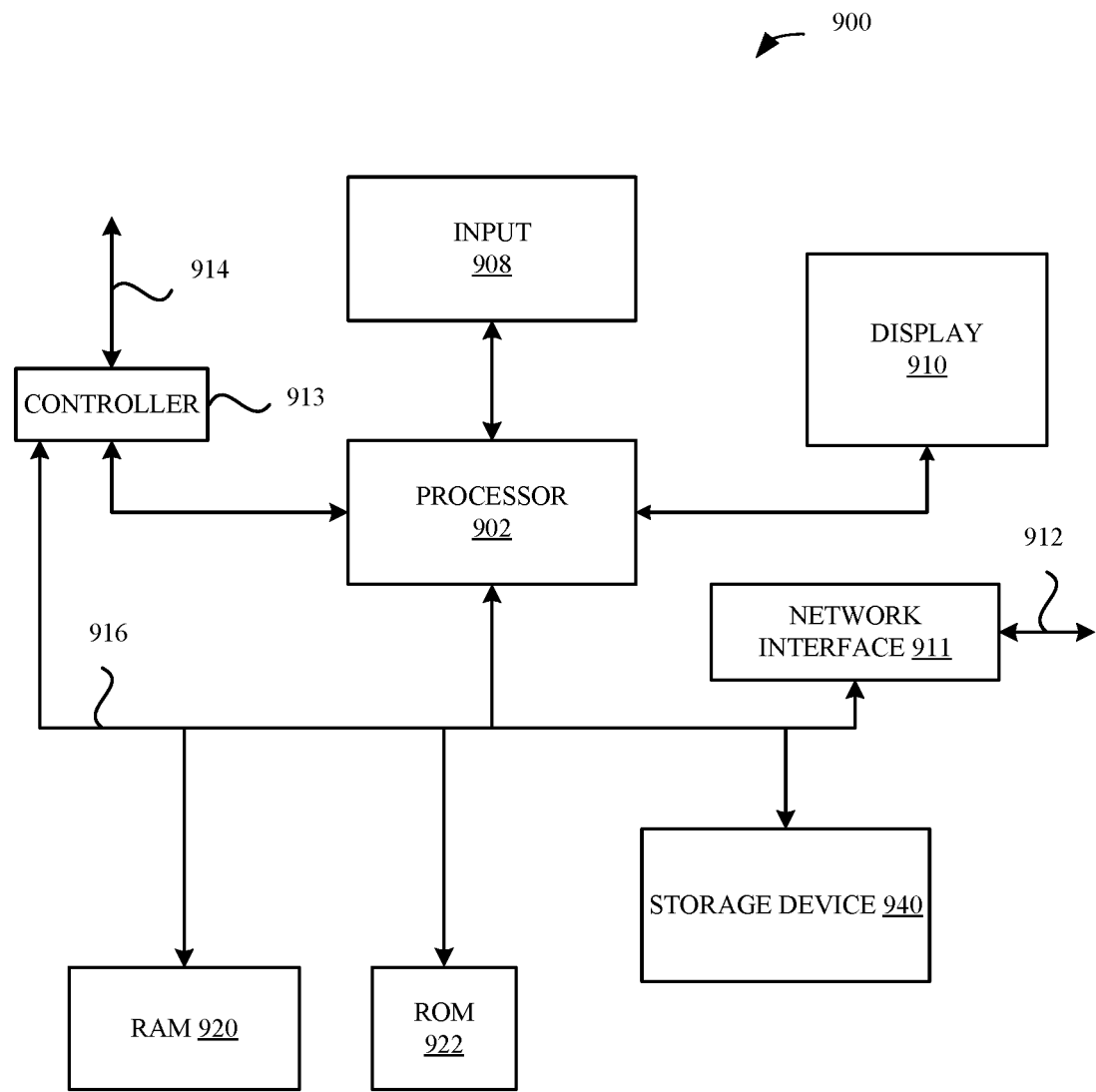
FIG. 9 illustrates exemplary apparatus useful for implementation, according to some embodiments.

FIG. 9 illustrates in block diagram format an exemplary computing device 900 that can be used to implement the various components and techniques described herein, according to some embodiments. In particular, the detailed view of the exemplary computing device 900 illustrates various components that can be included in the wireless devices STA 102, STA 104 or AP 110 illustrated in FIG. 3. As shown in FIG. 9, the computing device 900 can include a processor 902 that represents a microprocessor or controller for controlling the overall operation of computing device 900. The computing device 900 can also include a user input device 908 that allows a user of the computing device 900 to interact with the computing device 900. For example, the user input device 908 can take a variety of forms, such as a button, keypad, dial, touch screen, audio input interface, visual/image capture input interface, input in the form of sensor data, etc. Still further, the computing device 900 can include a display 910 (screen display) that can be controlled by the processor 902 to display information to the user (for example, information relating to incoming, outgoing, or active communication session). A data bus 916 can facilitate data transfer between at least a storage device 940, the processor 902, and a controller 913. The controller 913 can be used to interface with and control different equipment through an equipment control bus 914. The computing device 900 can also include a network/bus interface 911 that couples to a data link 912. In the case of a wireless connection, the network/bus interface 911 can include wireless circuitry, such as a wireless transceiver and/or baseband processor.

The computing device 900 also includes a storage device 940, which can comprise a single storage or a plurality of storages (e.g., hard drives), and includes a storage management module that manages one or more partitions within the storage device 940. In some embodiments, storage device 940 can include flash memory, semiconductor (solid state) memory or the like. The computing device 900 can also include a Random Access Memory ("RAM") 920 and a Read-Only Memory ("ROM") 922. The ROM 922 can store programs, utilities or processes to be executed in a non-volatile manner. The RAM 920 can provide volatile data storage, and stores instructions related to the operation of the computing device 900.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method comprising:
   by a wireless local area network station (STA):
   receiving, from a wireless local area network access point (AP) according to a first receiver operating mode (ROM) of the STA, a first data packet;
   sending a ROM indication to the AP;
   receiving an AP status packet from the AP;
   determining a delay regime for reception of a second data packet, wherein: i) the determining is based on the AP status packet, and ii) the second data packet is to be formatted according to a second ROM;
   sending an instruction packet to the AP, wherein the instruction packet comprises an indication of the delay regime, which indicates when the AP changes transmission of data packets from the first ROM to the second ROM; and
   receiving, from the AP according to the second ROM at a time in accordance with the delay regime, the second data packet.

2. The method of claim 1, wherein the instruction packet comprises a second indication corresponding to the second ROM.

3. The method of claim 2, wherein the delay regime indicates that: i) the AP should send the second data packet formatted according to the second ROM, and ii) the AP should not delay in sending the second data packet.

4. The method of claim 3, wherein the receiving the second data packet occurs approximately one short interframe space (SIFS) after an end of the instruction packet.

5. The method of claim 2, wherein the delay regime indicates that: i) the AP should send the second data packet formatted according to the second ROM, and ii) the AP should delay in sending the second data packet for a time delay period.

6. The method of claim 5, wherein the receiving the second data packet occurs with a delay greater than one short interframe space (SIFS) after an end of the instruction packet.

7. The method of claim 5, wherein a value of the time delay period is indicated in the instruction packet.

8. The method of claim 5, wherein: i) the STA and the AP practice portions of a wireless local area network standard, and ii) a value of the time delay period is indicated in the wireless local area network standard.

9. The method of claim 1, wherein the delay regime indicates that:
i)
  a) the AP should send the second data packet formatted according to either the first ROM or the second ROM, and
  b) the AP should send the second data packet after a time delay of approximately a short interframe space (SIFS); or
ii)
  a) the AP should send the second data packet formatted according to the second ROM, and
  b) the AP should send the second data packet after a time delay period.

10. The method of claim 9, wherein: i) the STA and the AP practice portions of a wireless local area network standard, and ii) a value of the time delay period is indicated in the wireless local area network standard.

11. The method of claim 9, further comprising:
receiving, from the AP, an adoption signal, wherein the adoption signal indicates a corresponding delay regime adopted by the AP for transmission of the second data packet.

12. The method of claim 9, wherein a value of the time delay period is indicated in the instruction packet.

13. The method of claim 12, wherein the value of the time delay period is indicated in the instruction packet in terms of: i) a number of milliseconds (ms), or ii) or a number of physical layer convergence procedure protocol data unit (PPDU) intervals.

14. A wireless local area network station (STA) comprising:
a wireless transceiver;
a processor coupled to the wireless transceiver; and
a memory coupled to the processor, wherein the memory includes instructions, that when executed by the processor, cause the STA to execute steps comprising:
  receiving, from a wireless local area network access point (AP) via the wireless transceiver and according to a first receiver operating mode (ROM) of the STA, a first data packet,
  sending, via the wireless transceiver, a ROM indication to the AP,
  receiving, via the wireless transceiver, an AP status packet from the AP,
  determining a delay regime for reception of a second data packet, wherein: i) the determining is based on the AP status packet and an energy level of a battery in the STA, and ii) the second data packet is to be formatted according to a second ROM;
  sending, via the wireless transceiver, an instruction packet to the AP, wherein the instruction packet comprises: i) a first indication of the delay regime, which indicates when the AP changes transmission of data packets from the first ROM to the second ROM, and ii) a second indication corresponding to the second ROM; and
  receiving, from the AP according to the second ROM at a time in accordance with the delay regime, the second data packet.

15. The STA of claim 14, wherein the delay regime indicates that: i) the AP should send the second data packet formatted according to the second ROM, and ii) the AP should not delay in sending the second data packet.

16. The STA of claim 14, wherein the delay regime indicates that: i) the AP should send the second data packet formatted according to the second ROM, and ii) the AP should delay in sending the second data packet for a time delay period.

17. A wireless local area network access point (AP) comprising:
a wireless transceiver;
a processor coupled to the wireless transceiver; and
a memory coupled to the processor, wherein the memory includes instructions, that when executed by the processor, cause the AP to execute steps comprising:
  sending, to a wireless local area network station (STA) via the wireless transceiver and according to a first receiver operating mode (ROM) of the STA, a first data packet,
  receiving, via the wireless transceiver from the STA, a ROM indication, wherein the ROM indication indicates a number of spatial streams (NSS) and/or a channel width,
  sending, via the wireless transceiver, an AP status packet to the STA,
  receiving, via the wireless transceiver, an instruction packet from the STA, wherein the instruction packet comprises: i) a first indication of a delay regime that is determined by the STA based on the AP status packet and indicates when the AP changes transmission of data packets from the first ROM to a second ROM and ii) a second indication corresponding to the second ROM, and
  sending, via the wireless transceiver at a time in accordance with the delay regime, a second data packet to the STA in accordance with the second ROM.

18. The AP of claim 17, wherein the steps further comprise:
sending, via the wireless transceiver to the STA, an adoption signal, wherein the adoption signal indicates a corresponding delay regime adopted by the AP for transmission of the second data packet.

19. The STA of claim 14, wherein the delay regime indicates that:
i)
  a) the AP should send the second data packet formatted according to either the first ROM or the second ROM, and
  b) the AP should send the second data packet after a time delay of approximately a short interframe space (SIFS); or ii)
   a) the AP should send the second data packet formatted according to the second ROM, and
   b) the AP should send the second data packet after a time delay period.

20. The AP of claim 17, wherein the delay regime indicates that:

i)
   a) the AP should send the second data packet formatted according to either the first ROM or the second ROM, and
   b) the AP should send the second data packet after a time delay of approximately a short interframe space (SIFS); or ii)
   a) the AP should send the second data packet formatted according to the second ROM, and
   b) the AP should send the second data packet after a time delay period.

* * * * *